United States Patent Office 3,083,236
Patented Mar. 26, 1963

3,083,236
HYDROGENATION OF 5-HYDROXY-METHYL FURFURAL
Torleif Utne, Warrenville, John D. Garber, Westfield, and Robert E. Jones, Rahway, N.J., assignors to Merck & Co., Inc., Rahway, N.J., a corporation of New Jersey
No Drawing. Filed Sept. 10, 1958, Ser. No. 760,056
2 Claims. (Cl. 260—635)

This invention relates to 5-hydroxymethyl furfural (HMF) and has for its object the provision of an improved process for forming derivatives from this compound. In accordance with our invention we subject HMF to catalytic hydrogenation to form a series of derivative compounds in an efficient operation.

The invention involves the discovery that HMF can be subjected to hydrogenation with a suitable catalyst and hydrogen under various conditions to produce different but related compounds. One important feature of the process is that the amounts or yields of the different compounds can be increased or decreased relative to each other by varying the temperature during hydrogenation. The principal compounds produced by the process of the invention are 2,5-furan-dimethanol, 2,5-tetrahydrofuran-dimethanol (THF-glycol), 1,2,6-hexanetriol, 1,2-hexanediol and 1,6-hexanediol, which may be represented respectively by the formulae

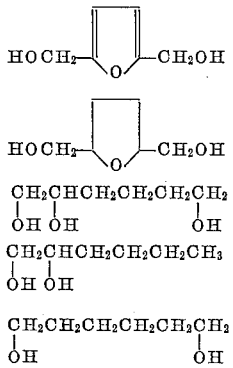

and

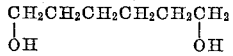

The percentages of these compounds in the reaction product can be controlled mainly by varying the temperature. For example, at the relatively low temperature of about 150° C. the product may contain from 90 to 100% of the 2,5-furandimethanol. When using the solvent dimethoxyethane and a pressure of about 280 p.s.i. an essentially quantitative yield of this glycol was obtained. At the medium temperature of about 175° C., about 43% of 1,2,6-hexanetriol was obtained. At about 200° C. the yield of 1,2-hexanediol was about 38%. In the range of 270° C. to 300° C., the yield of 1,6-hexanediol was about 25 to 30%. The saturated ring diol, 2,5-tetrahydro-furandimethanol appeared in the products of several operations and may predominate in the range of 150° to 175° C., whereas in the range of 200° to 300° C. the product is mainly linear diols, such as the 1,6-hexanediol. Higher or lower temperatures will produce the same results if the contact time is appropriately adjusted.

The process of the invention is carried out in its preferred embodiment by dissolving the HMF in an organic solvent such as an alcohol, preferably ethanol or methanol; or aliphatic ethers including diethoxyethane and dimethoxyethane, and hydrocarbons such as cyclohexane. The solution containing a small amount of a suitable catalyst, preferably copperchromite catalyst, is heated to the appropriate temperature for some time while under a hydrogen pressure varying from about 200 to 20,000 p.s.i., preferably from 280 to 6000 p.s.i. The copperchromite may also contain barium oxide which has a beneficial effect. About 10% by weight of catalyst based on the HMF is generally satisfactory. Palladium on charcoal was found to be an effective co-catalyst when mixed with copperchromite in producing 1,6-hexanediol.

The pressures used have varied from about 200 to 20,000 p.s.i. without noticeable additional benefits in the high part of the pressure range, especially above 6000 p.s.i. After the reaction, the product is cooled, filtered to remove the catalyst, and heated under a vacuum to remove the solvent. The compounds of the reaction product can be separated by fractional distillation.

The following examples illustrate processes carried out in accordance with the invention:

*Example I*

This is an operation controlled for the production of a product containing 2,5 furandimethanol as the major component.

One hundred and thirty-five grams of HMF was dissolved in 660 cc. of ethanol, and hydrogenated with 13.5 grams of copperchromite catalyst, under 5000 lbs. pressure at 150° C. for 12 hours. After cooling, the catalyst was filtered off, the filtrate concentrated under vacuum (20 mm.), and remaining solvent removed by pumping (1 mm.).

Yield: 138.5 grams, tan-colored crystals, (~ca. 100% of theory) M.P. 70–75° C.

The purity of this crude product was determined by C—H-analysis, UV- and IR-spectra:

λ max.=223 mμ; E%=768 (~92% purity). Calc. $C_6H_8O_3$: 56.20% C; 6.29% H. Found: 56.41% C; 6.53% H.

Since the HMF used was not pure (ca. 90%), the yield was actually essentially quantitative.

*Example II*

This is an operation controlled for the production of a product containing 1,2,6-hexanetriol as the major component.

One hundred grams of HMF was dissolved in 500 cc. of ethanol, and hydrogenated with 10 grams of copperchromite catalyst, under 5300 lbs. pressure at 175° C. for 12 hours. After cooling, the catalyst was filtered off, the filtrate was concentrated under vacuum (20 mm.), freed of remaining solvent by pumping (1 mm.) and filtered through sintered glass. The resulting product contained 97 grams of colorless oil—$n_D^{25}$=1.4675.

Vacuum distillation at 0.2 mm. gave 3 main fractions:

(1) 19 grams of colorless oil—$n_D^{25}$=1.4518, largely 1,2-hexanediol (ca. 20%).
(2) 21.5 grams of heavy oil—$n_D^{25}$=1.4680, mostly the saturated tetrahydrofuran dimethanol (ca. 20%).
(3) 40.5 grams of very viscous oil—$n_D^{25}$=1.4757, i.e. quite pure 1,2,6-hexanetriol (boiling range 120–49° at 0.2 mm.): ~ca. 43% of theory (calc. on pure HMF).

The identity of the 1,2,6-hexanetriol was determined on a purified sample by C—H-analysis, vapor phase chromatography, nuclear magnetic resonance, comparison of IR with an authentic sample, periodic acid oxidation and iodoformtest (negative).

Calc. $C_6H_{14}O_3$: 53.75% C; 10.52 H. Found (fraction 3.): 54.17% C; 10.30% H. Found after redistillation: 53.93% C; 10.21% H ($n_D^{25}$=1.4756).

*Example III*

This is an operation controlled for the production of a product containing 1,2-hexanediol as the major component.

Two hundred grams of HMF was dissolved in 1000 cc. of absolute ethanol, and hydrogenated with 20 grams of copperchromite catalyst, under 4500 lbs. pressure, at 200° C. for 7½ hours. After cooling, the catalyst was filtered off, the filtrate was concentrated under vacuum (20 mm.), freed of residual solvent by pumping (to reduce the vacuum to 1 mm.), and filtered through sintered glass. The resulting product contained 177 grams of colorless oil—$n_D^{25}$=1.4459.

Vacuum distillation at 0.5 mm. gave two main fractions:

(1) 69 grams low boiling oil (B.P. 73–82°)—$n_D^{25}$=1.4450, mainly 1,2-hexanediol ~ca. 38% of theory (calc. on pure HMF).

(2) 51 grams high boiling oil (B.P. 126–33°)—$n_D^{25}$=1.4755, mainly 1,2,6-hexanetriol ~ca. 28% of theory (calc. on pure HMF).

The identity of fraction (1) was indicated by C—H-analysis, IR-spectrum, iodoform-test (negative), periodic acid oxidation (80%), Tseou-Chow test for acetals (negative), active hydrogen determination (2.0 mols/mol).

Calc. $C_6H_{14}O_2$: 61.02% C; 11.95% H. Found: 61.13% C; 11.42% H.

In another operation similar to Example III, but using dimethoxyethane as the solvent, the yield was 30% of quite pure 1,2-hexanediol; B.P. 83–85° C. at 1.1 mm.; $n_D^{25}$=1.4426; periodic acid oxidation 100% of theory.

*Example IV*

This is an operation controlled for the production of the product 1,6-hexanediol as the major component.

(a) Twenty-five and two tenths grams of HMF was dissolved in 150 cc. of dimethoxyethane and hydrogenated with 5 grams of copperchromite catalyst, under 4800 lbs. pressure at 270° C. for 11 hours. After cooling, the catalyst was filtrated off, the filtrate concentrated under vacuum (20 mm.), and residual solvent removed by pumping (1 mm.), and filtration through sintered glass:

Yield: 19.5 grams colorless oil—$n_D^{25}$=1.4332.

This oil was fractionated by distillation under vacuum (1 mm.), and refrigeration of the fractions having refractive indexes between 1.4450 and 1.4550 gave crystalline 1,6-hexanediol, M.P. 39–41°. Also, the 1,6-diol was isolated as its bis-3,5-dinitrobenzoate by reacting an aliquot with 3,5-dinitrobenzoyl chloride. From this, the yield of 1,6-hexanediol was found to be 17.5% of theory; and if this figure is adjusted corresponding to the yield (80%) obtained by this benzoylation of authentic 1,6-hexanediol, the yield was 22%.

The M.P. of the impure bis-3,5-dinitrobenzoate was 155.5–65.5° C. (in at 135° C.), and after one recrystallization from dioxane and EtOH, 164–71° (in at 140° C.) (M.P. of pure dibenzoate, 175° C.). Its identity was determined by mixed M.P., giving no depression, by comparison with IR-, NMR- and X-ray diffraction spectra of authentic samples, and C—H-analysis.

Calc. $C_{20}H_{18}N_4O_{12}$: 11.08% N; 47.50% C; 3.58% H. Found: 11.19% N; 47.49% C; 3.48% H.

(b) Twenty-five and two-tenths grams of HMF was dissolved in 150 cc. of methanol, and 3 grams of palladium on charcoal and 5 grams of copperchromite catalyst were added. This mixture was heated under hydrogen, first for ca. 1½ hours at 75–80° C. and 450 lbs. pressure, then for 11 hours at 280° C. and 5500 lbs pressure. After cooling, the catalysts were filtered off, the filtrate concentrated under vacuum (20 mm.), then pumped (1 mm.) free of solvent, and filtered through sintered glass:

Yield: 19.0 grams yellow oil: $n_D^{25}$=1.4496.

The 1,6-hexanediol was isolated as its bis-3,5-dinitrobenzoate as in (a), giving a yield corresponding to 24.5% of 1,6-hexanediol, or 30.5% if corrected for the yield of the benzoylation reaction. The derivative was identified as in (a).

The process described in Example IVb was repeated using cyclohexane as a solvent. The product appeared to be predominantly THF-glycol, based on I.R. and refractive index measurements on the distillate.

*Example V*

This is another operation controlled to produce 2,5-furandimethanol.

Twenty-five grams of HMF was dissolved in 150 cc. of dimethoxyethane, and hydrogenated with 5 grams of copperchromite catalyst, under 280 lbs. pressure at 150° C. for 11 hours. After cooling, the catalyst was filtered off, the filtrate concentrated under vacuum (20 mm.), and pumped free of solvent (1 mm.):

Yield: 26.4 grams tan-colored crystals (~ca. 100% of theory). U.V.: λ max.=223; E%=778 (~93% purity).

The above crude was washed with ethyl ether, which removed some dark oil, giving 22.5 grams of nice, tan-colored crystals: M.P. 74.5–77°. U.V.: λ max.=223; E%=870.

Since the HMF used was not pure (ca. 90%), the yield was essentially quantitative.

The hydrogenation reactions result not only in the main products described in the examples but also in the saturated tetrahydrofurandimethanol

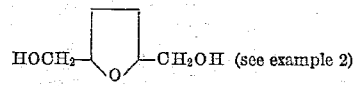
$HOCH_2$—O—$CH_2OH$ (see example 2)

It appears from our experimental work that this saturated ring diol is found in varying amounts in products produced below 200° C. and is in appreciable amounts in products produced in the range of 150° to 175° C. with the copperchromite systems described. However THF-glycol may be produced in over 90% yield using either Raney nickel (1000 p.s.i.g.) or palladium on charcoal (40 p.s.i.g.). It appears also that in products produced in operations carried out at temperatures above 200° C. there is a preferential formation of the linear diols, and that in the range of 250° C. to 300° C. 1,6-hexanediol is formed.

We claim:

1. The process which comprises reacting 5-hydroxymethyl furfural in an organic solvent of the group consisting of methanol, ethanol, diethoxyethane, dimethoxyethane and cyclohexane and in the presence of a copper chromite catalyst with hydrogen under a pressure of from 200 to 6000 p.s.i. and at a temperature of about 175° C. to produce a product the major portion of which is 1,2,6-hexanetriol, and separating the 1,2,6-hexanetriol from the product.

2. The process which comprises reacting 5-hydroxymethyl furfural in solution in an organic solvent of the group consisting of methanol, ethanol, diethoxyethane, dimethoxyethane and cyclohexane and in the presence of a copper chromite catalyst with hydrogen under a pressure of from 200 to 6000 p.s.i. and at a temperature of about 200° C. to produce a product the major portion of which is 1,2-hexanediol, and separating the 1,2-hexanediol from the product.

References Cited in the file of this patent

UNITED STATES PATENTS

| | | |
|---|---|---|
| 2,129,507 | Salzberg | Sept. 6, 1938 |
| 2,137,407 | Lazier | Nov. 22, 1938 |
| 2,143,370 | Fitzky | Jan. 10, 1939 |
| 2,201,347 | Rittmeister | May 21, 1940 |
| 2,423,783 | Lippincott | July 8, 1947 |
| 2,838,523 | Dunlop et al. | June 10, 1958 |
| 2,851,468 | Snyder | Sept. 9, 1958 |

OTHER REFERENCES

Newth et al.: J. Chem. (London) 1945, pages 1–4.
Dunlop et al.: The Furans, pp. 693–8 (1953).
Cope et al.: J. Am. Chem. Soc., vol. 77 (1955), pages 393–6.
Balandin et al.: Chem. Abstracts, vol. 50 (1956), cols. 1746–8 (abstract of Doklady Akad. Nauk U.S.S.R. 100 917–20 (1955)).